United States Patent
Yano et al.

[15] 3,647,415
[45] Mar. 7, 1972

[54] TANTALUM POWDER FOR SINTERED CAPACITORS

[72] Inventors: Tomosaburo Yano, Yokohama; Naoaki Oishi, Ichikawa-shi; Akitoshi Komatsu, Aizuwakamatsu-shi; Keizi Koyama, Kawanuma-gun, all of Japan

[73] Assignee: Show Denko Kabushiki Kaisha, Tokyo, Japan

[22] Filed: Oct. 21, 1968

[21] Appl. No.: 769,366

[30] Foreign Application Priority Data

Oct. 25, 1967 Japan..................................42/68318

[52] U.S. Cl. .................................75/0.5 BB, 29/420, 75/84
[51] Int. Cl. ...........................................................B22f 9/00
[58] Field of Search ..........................75/0.5, 84; 204/10, 290; 29/420

[56] References Cited

UNITED STATES PATENTS

| | | | |
|---|---|---|---|
| 3,141,235 | 7/1964 | Lenz | 75/84 |
| 3,144,328 | 8/1964 | Doty | 75/84 |
| 3,151,971 | 10/1964 | Clough | 75/0.5 |
| 3,295,951 | 1/1967 | Fincham et al. | 75/0.5 |
| 3,415,639 | 12/1968 | Daendliker et al. | 75/0.5 |
| 3,418,106 | 12/1968 | Pierret | 75/0.5 |
| 3,473,915 | 10/1969 | Pierret | 75/0.5 |
| 3,499,753 | 3/1970 | Daendliker | 75/0.5 |

FOREIGN PATENTS OR APPLICATIONS

| | | | |
|---|---|---|---|
| 713,538 | 7/1965 | Canada | 204/10 |
| 657,781 | 2/1963 | Canada | 75/0.5 |

*Primary Examiner*—L. Dewayne Rutledge
*Assistant Examiner*—W. W. Stallard
*Attorney*—Sherman and Shalloway

[57] ABSTRACT

Tantalum powder for electrolytic capacitors wherein tantalum particles in said powder have an average flakiness of 2 to 60, at least 80 percent by weight of said powder consisting of particles having a shorter breadth of 3 to 250$\mu$ and said powder being free from particles having a shorter breadth of above 500$\mu$, and methods of preparing the same.

5 Claims, No Drawings

TANTALUM POWDER FOR SINTERED CAPACITORS

This invention relates to an improved tantalum powder for use in the production for sintered anode tantalum capacitors and methods for preparing the same.

Generally speaking, the characteristics such as higher specific capacitance, i.e., higher capacitance per unit weight of used material, lower DC leakage, higher breakdown voltage, etc., are desirable in electrolytic capacitors. Sintered anode tantalum capacitors have recently come into wide use owing to such comparatively favorable characteristics. However, in order to obtain much higher capacitance and other improved characteristics, there is still much room for improvement.

Sintered anode tantalum capacitors, as is well known, are manufactured by compressing tantalum powder to form a pellet, sintering a so compressed pellet in a vacuum sintering furnace to form a porous body, and subjecting it to anodization in a proper electrolyte, for instance, a diluted phosphoric acid solution to form a continuous dielectric oxide film on the sintered body. Production techniques of such tantalum powder are also well known in the art. For instance, tantalum metal is prepared by the reduction of potassium fluotantalate, $K_2TaF_7$, with sodium metal or by the molten salt electrolysis of tantalum chloride or tantalum oxide. Then, when it is obtained as a powder of fine particles, it is refined and used as it is, and when in a state of coarse particles, it is milled, refined and used. In milling the metal, it should be in the state that several thousand p.p.m., for instance, 3,000 to 5,000 p.p.m. of hydrogen is absorbed or occluded therein. Without such amounts of hydrogen absorbed, the metal can not be ground to a powder because of its high ductility. Hydriding tantalum metal is attained by heating it in a hydrogen atmosphere. In the refining process, such as acid leaching, prior to the milling process, hydrogen sometimes is absorbed by the metal. Then, the powder is properly refined, sieved, and classified. Spherical or almost spherical powder with a particle size of about 3 to 250$\mu$ is conventionally employed for use in the manufacture of sintered anode tantalum capacitors.

One of the objects to sinter tantalum powder is to form a porous sintered body having a necessary mechanical strength and a predetermined shape by the partial sintering of it. Another object is to remove as much impurities as possible contained in the powder by application of high temperature and vacuum. These impurities are those which are contained initially in the starting material, and those which are commingled during the processes of reduction and milling. They include elements which adversely affect DC leakage and breakdown voltage, for instance, Fe, Ni, Cr, C, Na, K, etc. Such objectionable impurities are impossible to completely remove even in the refining process and it is unavoidable that they remain in the powder on the order of up to few hundred p.p.m.

In order to reduce unavoidably remaining objectionable impurities to a minimum and to obtain sintered capacitors with the lower DC leakage and the higher breakdown voltage, it is required to execute the sintering process at high temperatures. On the other hand, to obtain sintered capacitors with high capacitance, the sintered anode must have an effective surface of a larger area. The higher the sintering temperature and the longer the sintering time, the more increased is the degree of sintering. As a result, the obtained sintered body shrinks, the porosity decreases, and an effective surface area declines. If tantalum powder of excessively fine particles is employed to obtain the larger surface area, it is even more sintered, with an excessive shrinkage of the body and the lesser surface area. Thus, there are incompatible relationships between specific capacitance and DC leakage or breakdown voltage in sintered capacitors.

Accordingly, in order to obtain sintered capacitors with maximum capacitance, while maintaining low DC leakage and high breakdown voltage, every effort has been made to reduce impurities in tantalum powder by refining to a minimum or to use tantalum powder with a properly controlled particle size. (See, for instance, U.S. Pat. No. 3,295,951 and Belgian Pat. No. 681,428.) Despite such an effort, there was a certain limit in attainable specific capacitance in conventional sintered anode tantalum capacitors. In the standard conditions commonly employed to produce sintered anode tantalum capacitors, that is, under a green density (density of preformed body) of 7.0 g./cc., $10^{-5}$ mm. Hg, sintering at 1,900° C., 30 min. and anodization at 200 volts, the upper limit of specific capacitance in sintered capacitors to be obtained by use of conventional tantalum powder was about 3,300 to 3,500 $\mu$F.v./g. If lower temperatures are employed, a capacitance of about 4,000 to 6,000 may be obtained, but DC leakage becomes extremely high and breakdown voltage lowers remarkably. As a result, the working voltage and reliability of the capacitor extremely decline.

In accordance with the present invention mentioned below, specific capacitance as high as 3,500 to 4,000 is obtainable by the above-mentioned standard conditions. In order to obtain a capacitance of 3,300 to 3,500 equivalent to that of conventional powder by using the powder produced in the invention, a sintering temperature of about 2,000° C. can be applied. Thus, impurities removal becomes almost perfect and consequently, better DC leakage and breakdown voltage characteristics are obtained in the capacitor. The main cause for such a spectacular effect relates to tantalum particle shape in the invention. Tantalum powder in the invention consists of flat particles as discussed in detail below. The fact that the tantalum powder which consists of flat particles can stand the high sintering temperature and prolonged sintering time, produce a porous sintered body with less shrinkage and larger surface area and consequently result in excellent sintered anode tantalum capacitors is one which has now been found for the first time.

One object of this invention is to provide tantalum powder capable of producing sintered anode tantalum capacitors having a high capacitance, low DC leakage, and high breakdown voltage. Another object is to provide tantalum powder capable of standing the sintering at higher temperatures to produce sintered anode tantalum capacitors having a large surface area and minimum impurities. Further, this invention is intended to provide methods of manufacturing such an improved tantalum powder. Other objects and advantages of this invention will be apparent from the following description.

Tantalum powder for electrolytic capacitors of the present invention is powder wherein tantalum particles have an average flakiness of 2-60, at least 80 percent by weight of said powder consisting of particles having a shorter breadth of 3 to 250$\mu$, the powder being free from particles having a shorter breadth of above 500$\mu$.

The average flakiness means the average of flakiness or flatness values of particles and the flakiness is expressed by a rate of the shorter breadth to the height of a particle. A particle having a flakiness greater than 1 is called a flaky or flat particle.

The shorter breadth of a particle is defined as follows. The particle is allowed to stand on a plane in the most stable state, and a projected image of the particle is enclosed on two sides by sets of two parallel lines. Thus, the shorter breadth of the particle is a distance between a set of two parallel lines chosen from the above which has the shortest interval.

The height of a particle means a distance between a plane on which the particle is allowed to stand in the most stable state and another plane which is parallel to such plane and encloses the particle on two sides together with the plane.

The average flakiness of particles can be determined with a microscope. For instance, the shorter breadth of particles is measured with a microscope by dispersing them and letting them stand on a slide glass in the stable conditions. The height of a particle is measured by viewing with a microscope the cross section of the powder in the direction of compression when the compressed body of powder is imbedded in a resin. The fully sufficient and reliable average flakiness can be obtained when 2,000 to 3,000 particles are averaged. For practical purposes, particles having a shorter breadth of 44$\mu$ or above can simply be determined with a corresponding sieve by watching whether or not they pass through the sieve. For instance, size 44μ corresponds to 325 mesh and 250μ to 60 mesh in ASTM E11-58T. It is desirable to directly measure particles of less than 44μ with a microscope but practically the classification determined by sedimentation-classifying analysis methods applies. The longer breadth or length of a particle is not specifically limited in the invention, but is practically impossible to produce particles having an excessively longer breadth.

Preferred embodiments of tantalum powder of this invention follow. In one preferred embodiment, the average flakiness of tantalum particles ranges from 5 to 20.

In another preferred embodiment of the present invention, all the particles have a shorter breadth of from 3 to 250μ and at least 70 percent by weight of them have a shorter breadth of 3 to 44μ.

In the most preferable embodiment, the average flakiness ranges from 5 to 20, all the particles have a shorter breadth of from 3 to 250μ and at least 70 percent by weight of them have a shorter breadth of 3 to 44μ.

The tantalum powder of this invention per se is usable for producing sintered anode tantalum capacitors with higher capacitance, lower DC leakage, and higher breakdown voltage. Further, it can be mixed at an optional ratio with conventional tantalum powder to manufacture sintered anode tantalum capacitors. In this case, with increase in the tantalum powder of this invention in a mixture, capacitance increases, and it is possible to produce a capacitor having a desired capacitance to be selected according to uses.

Next, methods of the preparation of tantalum powder of this invention consisting of flat particles are disclosed below. The criticality of the invention is to process tantalum, the absorbed hydrogen of which is confined to a specific range. One of the preferred embodiments of the method is to mechanically compress and flatten the conventionally obtained tantalum powder after removing the absorbed hydrogen till the amount of hydrogen retained in the powder is reduced to 500 p.p.m. or below. With more than 500 p.p.m. of the hydrogen retained, particles are brittle and can not be pressed to a flat shape as desired. The reduction of several thousand p.p.m. of absorbed hydrogen into less than 500 p.p.m. is easily done by maintaining the powder at about 800° to 900° C. for about 1 hr. under reduced pressure. The measurement of amounts of absorbed hydrogen can be made by heating the specimen to about 2,000° C. under reduced pressure and by measuring the amounts of hydrogen which are completely separating from the powder. Mechanical pressing may be conducted with an ordinary ball mill, rod mill, roll mill, etc.

Another preferred embodiment to prepare the tantalum powder of this invention is to crush tantalum foil given a proper brittleness by hydriding the foil with a hydrogen of 500 to 3,000 p.p.m. For crushing, ball mills or hammer mills may be employed.

Examples illustrative of the present invention follow. Example I shows experiments with specimens having the average flakiness of particles inside and outside the scope of this invention. The experiments show the effects of the average flakiness on percentage shrinkage and specific capacitance of sintered body. In Example II another experiment similar to Example I is made with different specimens. In Example III experiments are conducted for a comparison between a case where particle size distribution is located within the scope and a case where it is outside the scope, with respect to acceptability of forming shaped body. Example IV shows various characteristics of a sintered anode capacitor obtained by use of the tantalum powder of the invention. Example V discloses mixing of the tantalum powder of this invention and conventional powder at various ratios and effects of the mixed amounts of the former powder on increase in capacitance of sintered capacitors are demonstrated.

EXAMPLE I

The average flakiness, specific surface area, and size distribution of each specimen are given in Table I.

Specimen A (outside the scope of the invention.):
  Conventional tantalum powder obtained by the reduction method by use of sodium metal.

Specimen B (outside the scope of the invention.):
  Prepared by causing Specimen A to absorb a hydrogen of 2,000 p.p.m. or above, pulverizing it with a ball mill for 10 min., sieving it to exclude particles smaller than 3μ, leaching the remainder with an acid solution, drying it and removing the absorbed hydrogen. Specimen B consists of particles smaller than those of Specimen A and therefore has a larger specific surface area (outside the scope of the invention).

Specimen C (within the scope of the invention.):
  Absorbed hydrogen in Specimen A is decreased to 500 p.p.m. or below. Then, the particles are pressed with a ball mill for 6 hr. and flattened. The treated particles are freed of particles smaller than 3μ, leached, dried and freed of the absorbed hydrogen.

Specimen D (within the scope of the invention.):
  Similar to Specimen C except the milling time is longer and, therefore, the average flakiness is higher.

TABLE I

| Specimen | Average flakiness | Specific surface area (cm.²/g.) | Size distribution 250–88μ (%) | 88–44μ (%) | <44μ (%) |
|---|---|---|---|---|---|
| A | 1 | 500 | 1.5 | 5.0 | 93.5 |
| B | 1.5 | 750 | 0.5 | 2.0 | 97.5 |
| C | 5 | 650 | 5.0 | 4.0 | 91.0 |
| D | 7 | 720 | 8.0 | 15.0 | 77.0 |

Premolded pellets having a green density of 7.0 g./cc. and a weight of 1.6 g. were produced by standard methods from the above specimens. They were sintered under a reduced pressure of $10^{-5}$ mm. Hg at 1,850°, 1,900°, 2,000° and 2,050° for 30 min. respectively. The percent shrinkage due to the sintering of pellets is given in Table 2.

TABLE 2

| | Percent shrinkage (%) due to sintering | | | |
|---|---|---|---|---|
| Specimen | Sintered 30 min. at 1,850° C. | Sintered 30 min. at 1,900° C. | Sintered 30 min. at 2,000° C. | Sintered 30 min. at 2,050° C. |
| A | 17 | 20 | 25 | 28 |
| B | 24 | 30 | 38 | 39 |
| C | 13 | 16 | 21 | 23 |
| D | 13 | 15 | 20 | 21 |

Obtained sintered pellets were anodized in a 0.01 percent phosphoric acid solution at 200 v. and each capacitance (μF.v./g.) was measured. The results are given in Table 3.

TABLE 3

| | Sintering temperature in °C. | | | |
|---|---|---|---|---|
| Specimen | 1,850° C. | 1,900° C. | 2,000° C. | 2,050° C. |
| A | 3,250 | 3,100 | 2,850 | 2,720 |
| B | 3,470 | 3,300 | 2,850 | 2,600 |
| C | 4,100 | 3,900 | 3,530 | 3,340 |
| D | 4,500 | 4,280 | 3,950 | 3,780 |

As seen in Table 3, each specimen decreased in capacitance with increase in sintering temperature. However, Specimens C and D with higher average flakiness show much higher capacitance than Specimens A and B having lower average flakiness It is clear that the use of tantalum powder consisting of flat particles causes higher capacitance of sintered capacitors.

EXAMPLE II

Specimens used in the example are as follows, the average flakiness, surface area, and particle size distribution of each of them being given in Table 4.

Specimen E (outside the scope of the invention.):
Tantalum metal sheet of 3 mm. thick hydride a hydrogen content of more than 2,000 p.p.m. ground for 10 min. with a ball mill, leached, dried and hydrogen removed.

Specimen F (within the scope of the invention.):
Tantalum foil of 0.01 mm. thick with hydrogen content of more than 2,000 p.p.m. crushed with a grinder, acid leached, dried and hydrogen removed.

Specimen G (within the scope of the invention.):
Like Specimen F, Specimen G is prepared except that the foil of an absorbed hydrogen content of 1,000 to 1,500 p.p.m. is employed.

Specimen H (outside the scope of the invention.):
Sufficiently remove absorbed hydrogen from particles of $250\mu$ or below obtained during the preparation of Specimen F, the hydrogen content being lowered to be several p.p.m. or below; crushed for 10 hrs. with a ball mill; particle size controlled so as to equalize specific surface area to those of Specimens E to H, leached, dried and absorbed hydrogen removed.

TABLE 4

| Specimen | Average flakiness | Specific surface area (cm.²/g.) | Size distribution (%) 250–88μ | 88–44μ | <44μ |
|---|---|---|---|---|---|
| E | 1.5 | 370 | 2 | 8 | 90 |
| F | 2 | 370 | 2 | 10 | 88 |
| G | 2.5 | 360 | 8 | 12 | 80 |
| H | 65 | 350 | 20 | 18 | 62 |

By use of above specimens, preformed pellets having a green density of 8.0 g./cc. and a weight of 3.0 g. are produced. Sintering is carried out under a reduced pressure of $10^{-5}$ mm. Hg for each pellet. Shrinkage due to sintering and capacitance after the anodization at 270 v. are given in Table 5. Specimen H had an average flakiness of above 60 and was disintegrated during sintering.

TABLE 5

| Specimen | Shrinkage (%) | Capacitance (μF.v./g.) |
|---|---|---|
| E | 15 | 1,830 |
| F | 11 | 1,900 |
| G | 10 | 1,900 |
| H | immeasurable | immeasurable |

It is clearly seen from Table 5 that the sintered body obtained by using tantalum powder of flat particles shows less shrinkage and is capable of providing capacitors of a higher capacitance. When the average flakiness is 2 or above, the effectiveness is conspicuous but with an excessively large average flakiness beyond 60, a desirable sintered body is found to be unobtainable.

EXAMPLE III

The specimens are prepared in the same way as in Specimen D and so classified as to have a different distribution of particle size. The average flakiness and size distribution are given in Table 6. Specimens J and K are within the scope of the present invention and Specimens M and L outside the scope of the invention.

TABLE 6

| | Particle size (%) | | | | |
|---|---|---|---|---|---|
| Specimen | >500μ | 500–250μ | 250–44μ | <44μ | Average flakiness |
| J | 0 | 0 | 19 | 81 | 7 |
| K | 0 | 2 | 8 | 90 | 6 |
| L | 0 | 21 | 22 | 57 | 7 |
| M | 8 | 10 | 22 | 60 | 8 |

Many preformed pellets having a green density of 7.5 g./cc. and a weight of 1.6 g. were produced. Sintering was carried out at 2,000° C. for 30 min. but no cracks were found on the sintered bodies from Specimens J and K. On the other hand, some pellets from Specimens L and M were disintergrated prior to the sintering, some during the sintering process and others had many cracks on the sintered body. It was found that if 20 percent or above of particles with more than $250\mu$ or any amount of coarse particles of above $500\mu$ are included in the flattened powder, the moldability rapidly deteriorates.

EXAMPLE IV

Tantalum powder having a size of $250\mu$ or below obtained by the conventional reduction methods by use of sodium metal was freed of the absorbed hydrogen up to 500 p.p.m. or below, pressed with a ball mill, and freed of coarse particles of above $250\mu$ and fine particles of below $3\mu$. Then, it was leached, dried, and freed of hydrogen. The average flakiness of the obtained powder was 5, and the surface area 660 cm.²/g. The powder was then compression-molded into pellets having a green density of 7.0 g./cc. and a weight of 1.6 g. and sintered at 2,000° C. for 30 min. under a reduced pressure of $10^{-5}$ mm. Hg. The percent shrinkage was 21 percent. The electric properties as a capacitor of the body anodized at 200 v. are reported in Table 7.

For comparative purposes, electrical properties of sintered anodes obtained with conventional tantalum powder having an average flakiness of 1 and the same size distribution as the above are shown.

TABLE 7

| Electric Properties | Example of the Invention | Comparative Example |
|---|---|---|
| Specific capacitance (μF.v./g.) | 3,500 | 2,800 |
| DC leakage (μa./g. at 140 v.) | 0.5 | 0.8 |
| EST (Ω) | 6.0 | 5.2 |
| Breakdown voltage (v. by liquid electrolyte, 0.01% H₃PO₄) | 330 | 300 |

EXAMPLE V

Specimens of mixtures of tantalum powder obtained in the same manner as Example IV, having a particle size of 3 to $250\mu$ and an average flakiness of 6 with conventional tantalum powder having an average flakiness of 1 and a particle size of 3 to 250μ at a blend ratio by weight of 20 to 80, 40 to 60 to 40 and 80 to 0 were prepared. From these specimens, pellets having a green density of 7.0 g./cc. and a weight of 1.6 g. were made and then these pellets were sintered at 1,900° C., under a reduced pressure of 10⁻⁵ mm. Hg for 30 min. The sintered bodies were anodized at 200 v., and specific capacitances of capacitors obtained are given in Table 8.

TABLE 8

| Content of tantalum powder having an average flakiness of 6 (%) | Specific capacitance (μf.v./g.) |
| --- | --- |
| 20 | 3,550 |
| 40 | 3,750 |
| 60 | 3,900 |
| 80 | 4,000 |

As clearly seen in Table 8, with increase in content of powder with flat particles, the specific capacitance of capacitors obtained increased.

We claim:

1. Tantalum powder for electrolytic capacitors comprising flat tantalum particles having an average flakiness of 2 to 60, at least 80 percent by weight of said powder consisting of particles having a shorter breadth of 3 to 250μ and said powder being free from particles having a shorter breadth above 500μ.

2. The tantalum powder of claim 1 wherein the average flakiness of said tantalum particles is 5 to 20.

3. The tantalum powder of claim 1 wherein all of said particles have a shorter breadth of 3 to 250μ and at least 70 percent by weight have a shorter breadth of 3 to 44μ.

4. The tantalum powder of claim 1 wherein said tantalum particles have an average flakiness of from 5 to 20, all of said particles have a shorter breadth of 3 to 250μ and at least 70 percent by weight of said particles have a shorter breadth of 3 to 44μ.

5. The tantalum powder of claim 1 further containing conventional capacitor grade tantalum powder.

* * * * *